US009582194B2

(12) United States Patent
Yang et al.

(10) Patent No.: US 9,582,194 B2
(45) Date of Patent: Feb. 28, 2017

(54) TECHNIQUES FOR IMPROVING PERFORMANCE OF A BACKUP SYSTEM

(71) Applicant: Veritas Technologies LLC, Mountain View, CA (US)

(72) Inventors: Yun Yang, Beijing (CN); Weibao Wu, Vadnais Heights, MN (US); Fanglu Guo, Los Angeles, CA (US); Satyajit Gorhe Parlikar, Shoreview, MN (US)

(73) Assignee: Veritas Technologies LLC, Mountain View, CA (US)

( * ) Notice: Subject to any disclaimer, the term of this patent is extended or adjusted under 35 U.S.C. 154(b) by 129 days.

(21) Appl. No.: 14/040,152

(22) Filed: Sep. 27, 2013

(65) Prior Publication Data

US 2015/0095596 A1    Apr. 2, 2015

(51) Int. Cl.
*G06F 12/00* (2006.01)
*G06F 3/06* (2006.01)

(52) U.S. Cl.
CPC .............. *G06F 3/061* (2013.01); *G06F 3/067* (2013.01); *G06F 3/0608* (2013.01); *G06F 3/0641* (2013.01); *G06F 3/0646* (2013.01); *G06F 3/0653* (2013.01)

(58) Field of Classification Search
None
See application file for complete search history.

(56) References Cited

U.S. PATENT DOCUMENTS

| 8,244,676 | B1 | 8/2012 | Uygur |
| 2004/0039891 | A1 | 2/2004 | Leung et al. |
| 2011/0113012 | A1 | 5/2011 | Gruhl et al. |
| 2013/0086341 | A1 | 4/2013 | Vasavi et al. |
| 2013/0110784 | A1 | 5/2013 | Guo et al. |

OTHER PUBLICATIONS

International Search Report and Written Opinion Issued by the U.S. Patent and Trademark Office as International Searching Authority for International Application No. PCT/US14/54195 mailed on Nov. 19, 2014 (8 pages).

*Primary Examiner* — Baboucarr Faal
(74) *Attorney, Agent, or Firm* — Wilmer Cutler Pickering Hale and Dorr LLP

(57) ABSTRACT

Techniques for improving performance of a backup system are disclosed. In one particular exemplary embodiment, the techniques may be realized as a method for improving performance of a backup system. The method may comprise performing a backup of a client device, tracking, using at least one computer processor, references to data segments that are located outside of a unit of storage associated with the backup, calculating utilization of the unit of storage associated with the backup based on the tracked references, determining if the calculated utilization meets a specified parameter, and determining one or more responsive actions in the event the calculated utilization meets the specified parameter.

15 Claims, 9 Drawing Sheets

TECHNIQUES FOR IMPROVING PERFORMANCE OF A BACKUP SYSTEM

FIELD OF THE DISCLOSURE

The present disclosure relates generally to data deduplication and, more particularly, to techniques for improving performance of a backup system.

BACKGROUND OF THE DISCLOSURE

Data deduplication allows backup systems to save storage space by reducing the backup of data previously backed up (i.e., duplicate data). A backup system may generate a fingerprint or hash of a data segment (e.g., a block) to be backed up. If the hash or fingerprint matches a data segment previously stored, a backup system may simply record a reference or pointer to the previously stored data segment. For example, a second backup of a server volume may not backup data segments (even if changed) if a reference from the backup to a previously stored copy of the segment may be made. References to previously stored segments may reduce an amount of storage needed for a backup by sharing segments across multiple backups. Restoration from a deduplicated backup may require that data is retrieved from the backup as well as data referenced by the backup.

References in backups to data segments may result in references to segments scattered across storage (e.g., references pointing to segments dispersed over a large volume). Restoration performance may be degraded as Input/Output (I/O) requests become random. Also, efforts to reduce fragmentation may increase backup server overhead.

In view of the foregoing, it may be understood that there may be significant problems and shortcomings associated with current security information improvement technologies.

SUMMARY OF THE DISCLOSURE

Techniques for improving performance of a backup system are disclosed. In one particular exemplary embodiment, the techniques may be realized as a method for improving performance of a backup system. The method may comprise performing a backup of a client device, tracking, using at least one computer processor, references to data segments that are located outside of a unit of storage associated with the backup, calculating utilization of the unit of storage associated with the backup based on the tracked references, determining if the calculated utilization meets a specified parameter, and determining one or more responsive actions in the event the calculated utilization meets the specified parameter.

In accordance with other aspects of this particular exemplary embodiment, the techniques may further comprise performing one or more responsive actions.

In accordance with further aspects of this particular exemplary embodiment, the one or more responsive actions may include at least one of: providing calculated utilization information to a user, recommending a backup action to a user, and identifying one or more referenced segments to send in a subsequent backup.

In accordance with additional aspects of this particular exemplary embodiment, the tracking of references to data segments outside of the backup may be performed at a client site.

In accordance with additional aspects of this particular exemplary embodiment, the tracking of references to data segments outside of the unit of storage may be performed by identifying data segments associated with the unit of storage.

In accordance with additional aspects of this particular exemplary embodiment, calculating utilization may comprise counting the identified data segments associated with the unit of storage and determining the portion of the unit storage used by the identified segments.

In accordance with additional aspects of this particular exemplary embodiment, the specified parameter may comprise a range of acceptable utilization of a unit of storage.

In accordance with additional aspects of this particular exemplary embodiment, the specified parameter may comprise a range of unacceptable utilization of a unit of storage.

In accordance with additional aspects of this particular exemplary embodiment, the responsive action may comprise sending one or more segments of unchanged data of a unit of storage in a subsequent backup based on a determination that the calculated utilization of a unit of storage is below a specified threshold.

In accordance with additional aspects of this particular exemplary embodiment, the one or more segments of unchanged data from a unit of storage may be combined with segments of data from a second unit of storage into a new unit of storage to reduce data fragmentation for a backup.

In accordance with additional aspects of this particular exemplary embodiment, the unit of storage associated with the backup may comprise a container.

In accordance with additional aspects of this particular exemplary embodiment, the techniques may further comprise providing a user interface to set a parameter specifying a utilization threshold for the unit of storage.

In accordance with additional aspects of this particular exemplary embodiment, the user interface may provide an indication of utilization for the unit of storage and an indication of estimated restoration time based at least in part on an estimation of fragmentation of data of the unit of storage.

In accordance with additional aspects of this particular exemplary embodiment, the user interface may provide an indication of estimated backup time based at least in part on a level of deduplication of data for the unit of storage.

In accordance with additional aspects of this particular exemplary embodiment, the techniques may be realized as at least one non-transitory processor readable storage medium storing a computer program of instructions configured to be readable by at least one processor for instructing the at least one processor to execute a computer process for performing the method.

In another particular exemplary embodiment, the technique(s) may be realized as an article of manufacture for improving performance of a backup system. The article of manufacture may comprise at least one non-transitory processor readable storage medium and instructions stored on the at least one medium. The instructions may be configured to be readable from the at least one medium by at least one processor and thereby cause the at least one processor to operate so as to perform a backup of a client device, track references to data segments that are located outside of a unit of storage associated with the backup, calculate utilization of the unit of storage associated with the backup based on the tracked references, determine if the calculated utilization meets a specified parameter, and determine one or more responsive actions in the event the calculated utilization meets the specified parameter.

In yet another particular exemplary embodiment, the techniques may be realized as a system for improving performance of a backup system comprising one or more processors communicatively coupled to a network. The one or more processors may be configured to perform a backup of a client device, track references to data segments that are located outside of a unit of storage associated with the backup, calculate utilization of the unit of storage associated with the backup based on the tracked references, determine if the calculated utilization meets a specified parameter, and determine one or more responsive actions in the event the calculated utilization meets the specified parameter.

In accordance with additional aspects of this particular exemplary embodiment, the tracking of references to data segments outside of the unit of storage may be performed at the client device.

In accordance with additional aspects of this particular exemplary embodiment, the tracking of references to data segments outside of the unit of storage may be performed by identifying data segments associated with a unit of storage.

In accordance with additional aspects of this particular exemplary embodiment, the responsive action may comprise sending one or more segments of unchanged data of a unit of storage in a subsequent backup based on a determination that the calculated utilization of a unit of storage is below a specified threshold.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EMBODIMENTS

Figure 1:
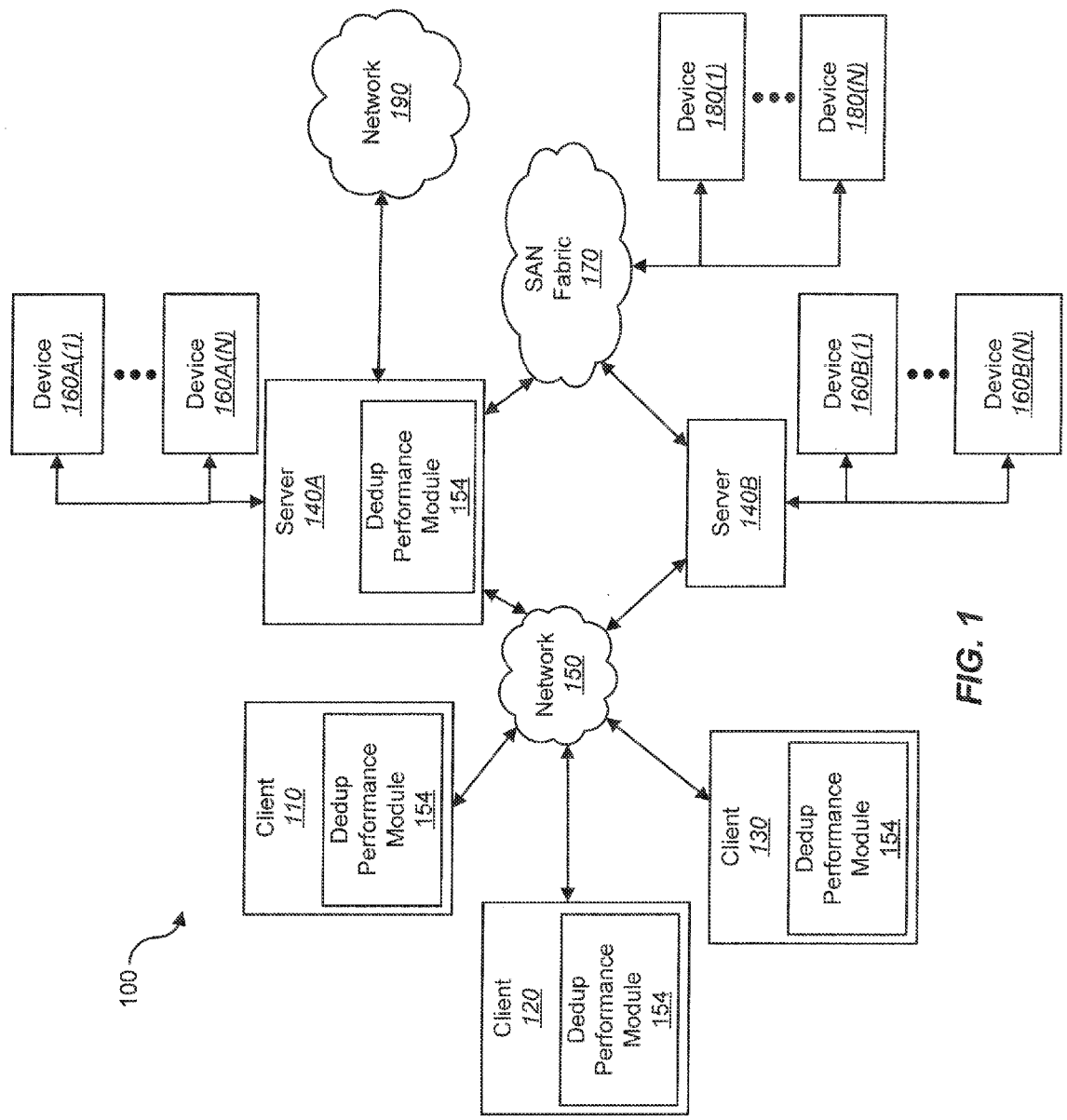
FIG. 1 shows a block diagram depicting a network architecture for improving performance of a backup system in accordance with an embodiment of the present disclosure.

FIG. 1 shows a block diagram depicting a network architecture 100 for improving performance of a backup system in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., dedup performance module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
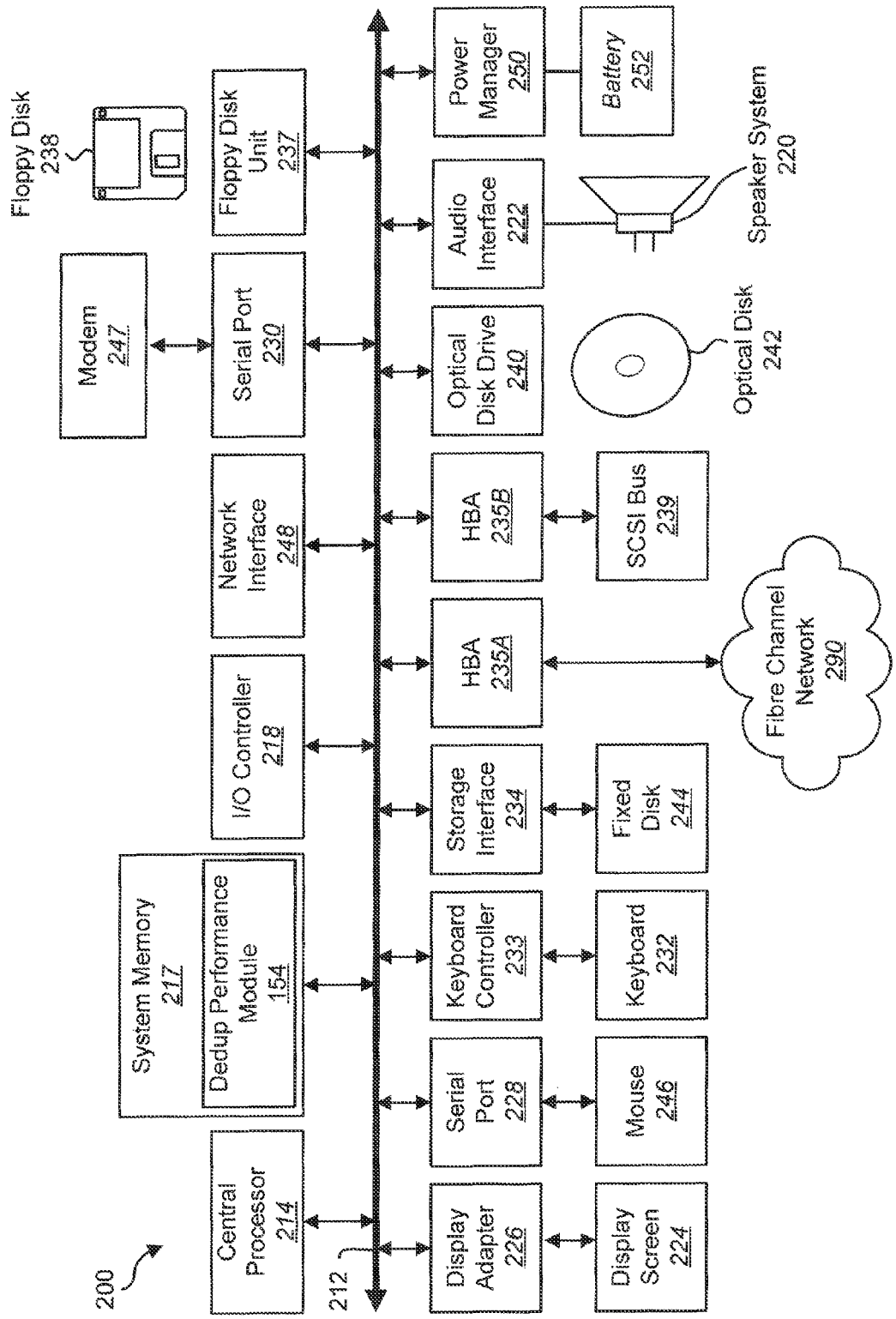
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180 (1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for backup system performance improvement such as, for example, dedup performance module 154. As illustrated, one or more portions of dedup performance module 154 may reside at a network centric location. For example, server 140A may be a server, a firewall, a gateway, or other network element that may perform one or more actions to improve backup system performance. According to some embodiments, network 190 may be an external network (e.g., the Internet) and server 140A may be a gateway or firewall between one or more internal components and clients and the external network.

Data within a particular unit of storage may be assumed, in some embodiments, to generally correlate to data locality in a backup. For example, if data is within a same container, it may be stored in a manner allowing more of the data to be read in a single I/O request. As data changes, subsequent backups may contain changes stored in a separate container so that the original data in a first container is not overwritten. Data which has not changed may be represented in the new second container by a reference (e.g., a pointer) to the corresponding segments in the first container. This deduplication of data may prevent writing of duplicate blocks and may save time and storage space during a backup. However, over time data may become more fragmented resulting in poor data locality. Restoration of such data may become more challenging and may take more time because I/O requests may be distributed or random across fragmented storage (e.g., across multiple containers in a volume). Dedup performance module 154 may identify containers with low utilization, which may be an indication of poor data locality. As explained in greater detail below, dedup performance module 154 may offer a user an ability to adjust deduplication in one or more backups to balance between backup storage space and performance and restoration performance.

According to some embodiments, dedup performance module 154 may track references to data segments outside of a unit of storage. For example, a backup may be performed using one or more units of storage (e.g., containers).

Dedup performance module 154 may track a number of segments associated with a particular unit of storage. For example, an initial backup may contain 100 megabytes (MB) of data, all of which is new. The data may be stored in five 20 MB containers, each container having four 5 MB segments. A second backup may contain changes to 5 MB of data in the second container and 15 MB of data in the third container. These changes may be stored in a new sixth container. Thus, for a restoration using the second backup, only 25% or 5 MB of the original second container may be used and the remainder of this data may be retrieved from the new sixth container. Dedup performance module 154 may monitor backups and may determine that only a certain portion of a container is used in a backup and that the rest of the data for that container is obtained by references to one or more other containers. According to some embodiments, dedup performance module 154 may make this determination by tracking an amount of data written to a container. In some embodiments, dedup performance module 154 may know or receive the container size and may be able to determine the proportion of the container used by data.

In some embodiments, dedup performance module 154 may track writes to containers and may determine that a container is under-utilized, without knowing a container size, by comparing writes to that container with writes to other containers. For example, if a backup writes to six containers and most of the writes total around 20 MB per container while writes to the second container only total around 5 MB, dedup performance module 154 may determine that the second container is under-utilized. In one or more embodiments, utilization may be measured by dedup performance module 154 against a specified parameter.

In one or more embodiments, dedup performance module 154 may determine that segments or portions of data are written to a container by one or more identifiers written with a segment. For example, each backup image may have a generation number which may correspond to a particular backup (e.g., a first backup may be generation 0, a second backup generation 1, etc.). A backup image may consist of new data (e.g., segments having a generation 1 in the example above) and possibly references to data segments from a previous backup which do not have to be sent by the client (e.g., segments having a generation 0 in the example above). Dedup performance module 154 may monitor generation numbers associated with a segment, and may determine an amount of data associated with each generation in a backup. A data segment may contain metadata consisting of length, generation number and offset. The sum of all segments' length may be equal to the size of a backup image. The generation number may identify the backup a segment is associated with. An offset may be the offset of data from a starting point of the data in a same generation. For example, a data segment may be associated with the following data structure:

```
typedef struct ih_segment_s {
    int64_t length;          /* data length */
    int64_t generation;      /* in which backup, it's generated */
    int64_t offset;          /* offset in the generation */
    struct ih_segment_s* next;
} ih_segment_t;
```

By monitoring backups, dedup performance module 154 may be able to identify units of data (e.g., containers) having only a small amount of data written to them (e.g., by knowing the container size or by counting segments written to a particular generation relative to other generations). By identifying units of data having only a relatively small proportion of data written to them, dedup performance module 154 may infer that such units of data are under-utilized and may reduce data restoration performance. By tracking utilization of units of data at one or more clients (e.g., clients 110, 120, and 130), dedup performance module 154 may distribute computational load across backup clients rather than centralizing a load from multiple clients on a backup server.

After calculating utilization of a unit of storage, dedup performance module 154 may compare the utilization against one or more specified parameters. For example, a specified parameter may comprise a range of acceptable utilization of a unit of storage, a range of unacceptable utilization of a unit of storage, and/or a threshold of utilization. Dedup performance module 154 may provide a user interface to set a utilization parameter. A user interface may provide an indication of utilization for one or more units of storage. A user interface may also provide an indication of estimated restoration time based at least in part on an estimation of fragmentation of data of the unit of storage, historical restoration time data, an amount of data, and/or other factors. A user interface may provide an indication of estimated backup time based on a level of deduplication of data for the unit of storage, an amount of data, historical backup time data, and/or other factors. According to some embodiments, a user interface may allow a user to choose a balance between restoration speed and backup speed and backup storage size by specifying one or more parameters indicating an acceptable level of utilization for a container.

According to some embodiments, dedup performance module 154 may take one or more actions if it determines that a unit of storage or a container is under-utilized. Responsive actions may include one or more of providing calculated utilization information to a user, recommending a backup action to a user, and identifying one or more referenced segments to send in a subsequent backup. Responsive action may also include sending one or more segments of unchanged data of a unit of storage in a subsequent backup based on a determination that the calculated utilization of the unit of storage is below a specified threshold. The one or more segments of unchanged data from a unit of storage may be combined with segments of data from a second unit of storage into a new unit of storage to reduce data fragmentation for a backup.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, dedup performance module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
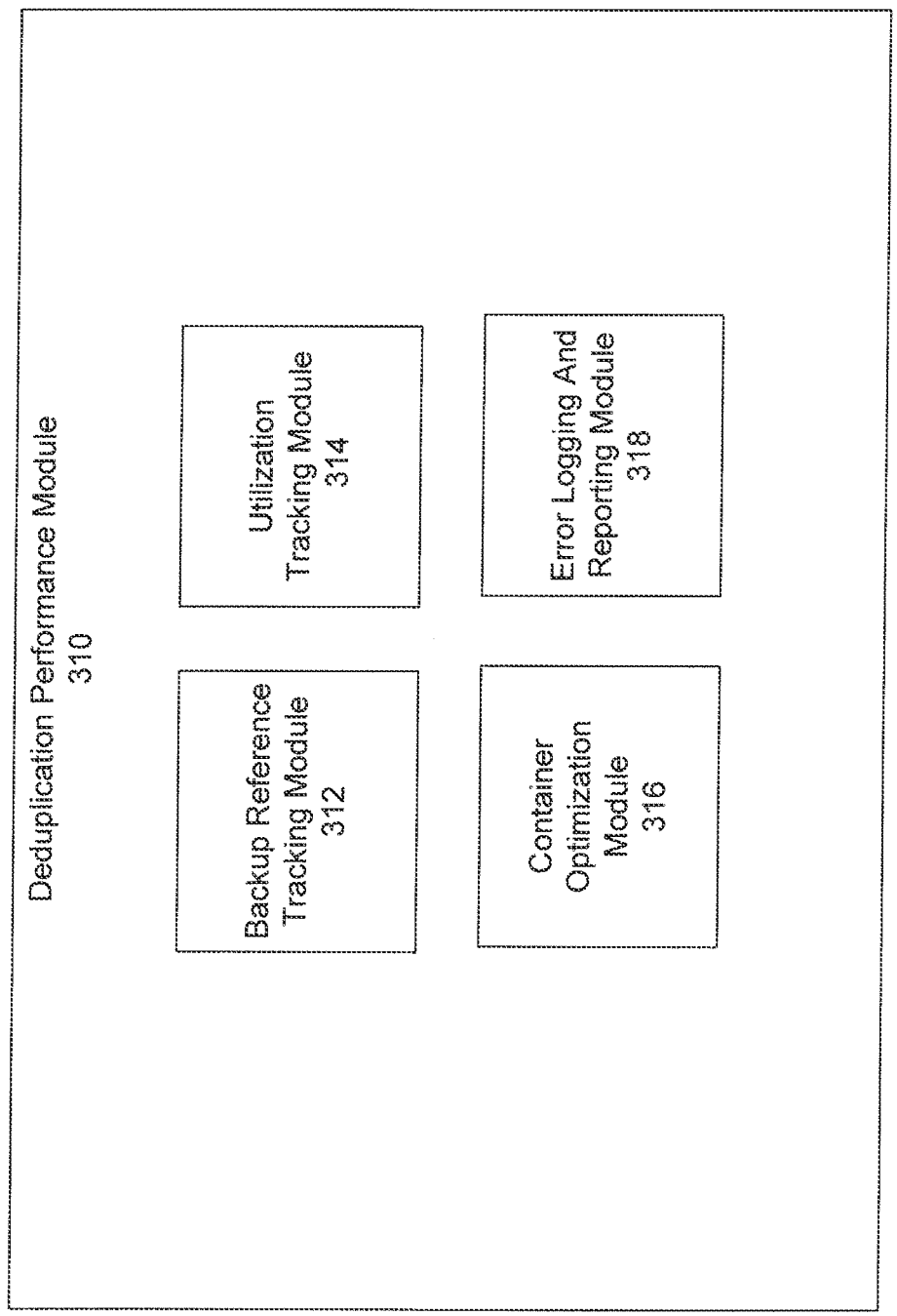
FIG. 3 shows a module for improving performance of a backup system in accordance with an embodiment of the present disclosure.

Referring to FIG. 3, there is shown a deduplication performance module 310 in accordance with an embodiment of the present disclosure. As illustrated, the deduplication performance module 310 may contain one or more components including backup reference tracking module 312, utilization tracking module 314, container optimization module 316, and error logging and reporting module 318.

The description below describes network elements, computers, and/or components of a system and method for improving performance of a backup system that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Backup reference tracking module 312 may reside at backup client. In some embodiments, backup reference tracking module 312 may reside at a server. Backup reference tracking module 312 may determine that segments or portions of data are written to a container by one or more identifiers written with a segment (e.g., a generation number which may correspond to a particular backup). A backup image may consist of new data (e.g., segments having a generation 1) and possibly references to data segments from a previous backup which do not have to be sent by the client (e.g., segments having a generation 0). Backup reference tracking module 312 may monitor generation numbers associated with a segment, and may determine an amount of data associated with each generation in a backup.

A data segment may contain metadata consisting of length, generation number and offset. In some embodiments, backup reference tracking module 312 may calculate a total length associated with each generation, may count the references to a generation, or may do both.

Utilization tracking module 314 may receive reference data from backup reference tracking module 312. Utilization tracking module 314 may be able to identify units of data (e.g., containers) having only a small amount of data written to them (e.g., by knowing the container size or by counting segments written to a particular generation relative to other generations). By identifying units of data having only a relatively small proportion of data written to them, utilization tracking module 314 may infer that such units of data are under-utilized and may reduce data restoration performance.

Container optimization module 316 may receive utilization information from utilization tracking module 314. Container optimization module 316 may compare the utilization against one or more specified parameters. For example, a specified parameter may comprise a range of acceptable utilization of a unit of storage, a range of unacceptable utilization of a unit of storage, and/or a threshold of utilization. Container optimization module 316 may take one or more actions if it determines that a unit of storage or a container is under-utilized. Responsive actions may include one or more of providing calculated utilization information to a user, recommending a backup action to a user, and identifying one or more referenced segments to send in a subsequent backup. Responsive action may also include sending one or more segments of unchanged data of a unit of storage in a subsequent backup based on a determination that the calculated utilization of the unit of storage is below a specified threshold. The one or more segments of unchanged data from a unit of storage may be combined with segments of data from a second unit of storage into a new unit of storage to reduce data fragmentation for a backup.

Error logging and reporting module 320 may produce logs, reports, or other information associated with improving performance of a backup system.

Figure 4:
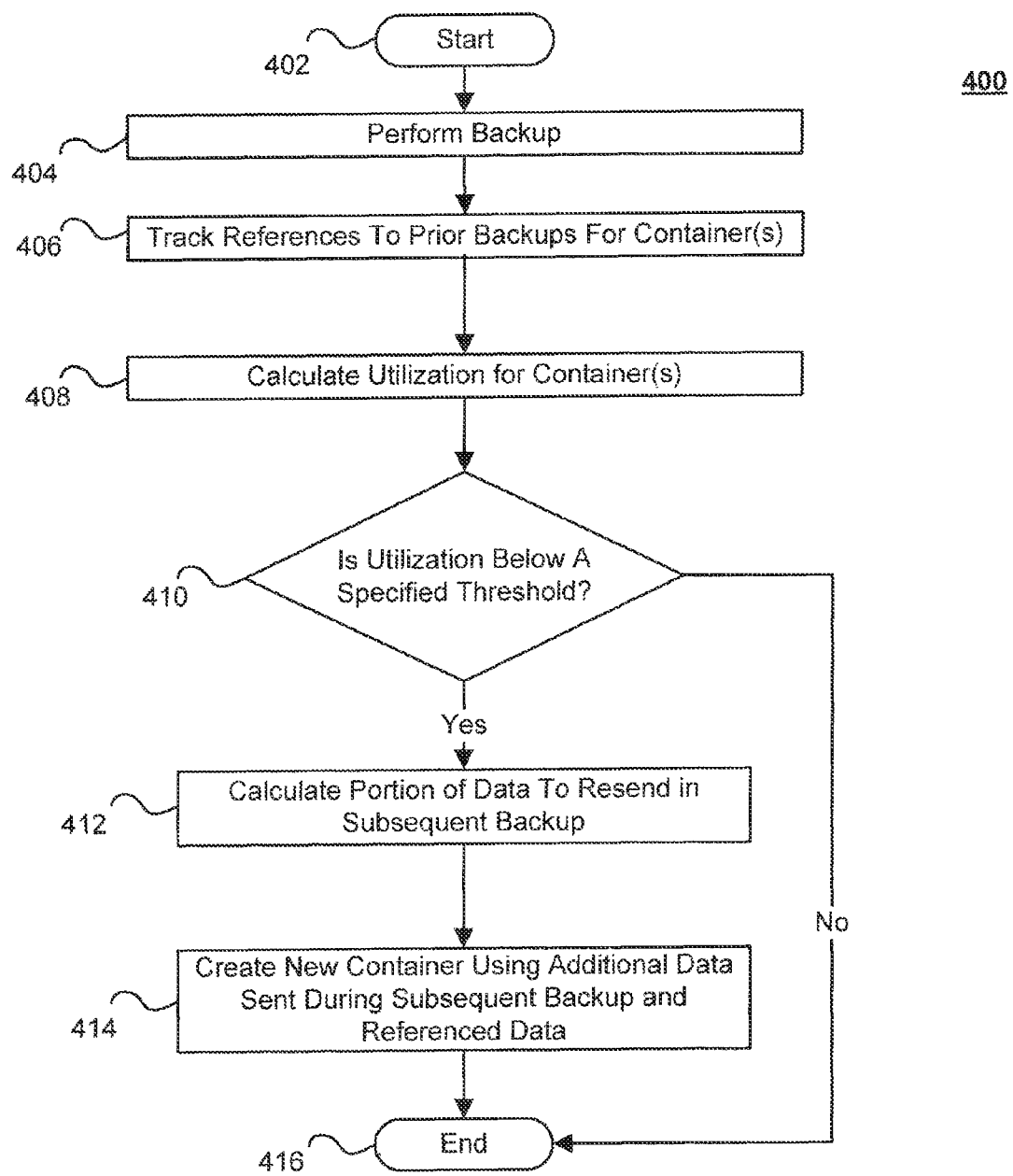
FIG. 4 depicts a method for improving performance of a backup system in accordance with an embodiment of the present disclosure.

Referring to FIG. 4, there is depicted a method 400 for improving performance of a backup system in accordance with an embodiment of the present disclosure. At block 402, the method 400 may begin.

At block 404, a backup may be performed. At block 406 references to prior backups may be tracked for one or more containers. For example, segments or portions of data are written to a container may be identified by one or more identifiers written with a segment (e.g., a generation number which may correspond to a particular backup). A backup image may consist of new data (e.g., segments having a generation 1) and possibly references to data segments from a previous backup which do not have to be sent by the client (e.g., segments having a generation 0). Generation numbers or other identifiers associated with a segment may be monitored and an amount of data associated with each generation in a backup may be determined.

At block 408, utilization for one or more containers may be determined. In some embodiments, utilization may be calculated or estimated at a backup client. Utilization may be determined by knowing a container size and by comparing an amount of data written to a container with a size of a container. In some embodiments, utilization may be determined by counting segments of a backup particular generation relative to segments written other generations). Other methods of calculating or estimating utilization of a container may be implemented (e.g., receiving utilization information from a backup server).

At block 410 it may be determined whether utilization is below a specified threshold. If utilization is below a specified threshold the method 400 may continue at block 412. If utilization is at or above a specified threshold the method 400 may end at block 416. Other utilization comparisons may be implemented (e.g., comparing utilization against a specified range).

At block 412, one or more responsive actions may be taken for a container based on a comparison with one or more utilization parameters. For example, a portion of data may be identified to resend in a subsequent backup (i.e., a portion of data may exist in a prior backup image but may be sent from a client to a backup server again in order to reduce fragmentation caused by deduplication). A responsive action taken may depend on user specified parameters, user input in response to a prompt, a level of utilization of a container, an amount of data referenced, and other factors.

At block 414, during a subsequent backup a new container may be created using resent data (i.e., data that was sent from a client even though it was available on the server) and new data. The new container may provide a container with a good locality of data that may reduce fragmentation of data, reduce I/Os necessary for a restoration, and improve restoration performance.

At block 416, the method 400 may end.

Utilization parameters may be configurable so that a user may determine a level of utilization that triggers sending duplicate data for a container.

Figure 5:
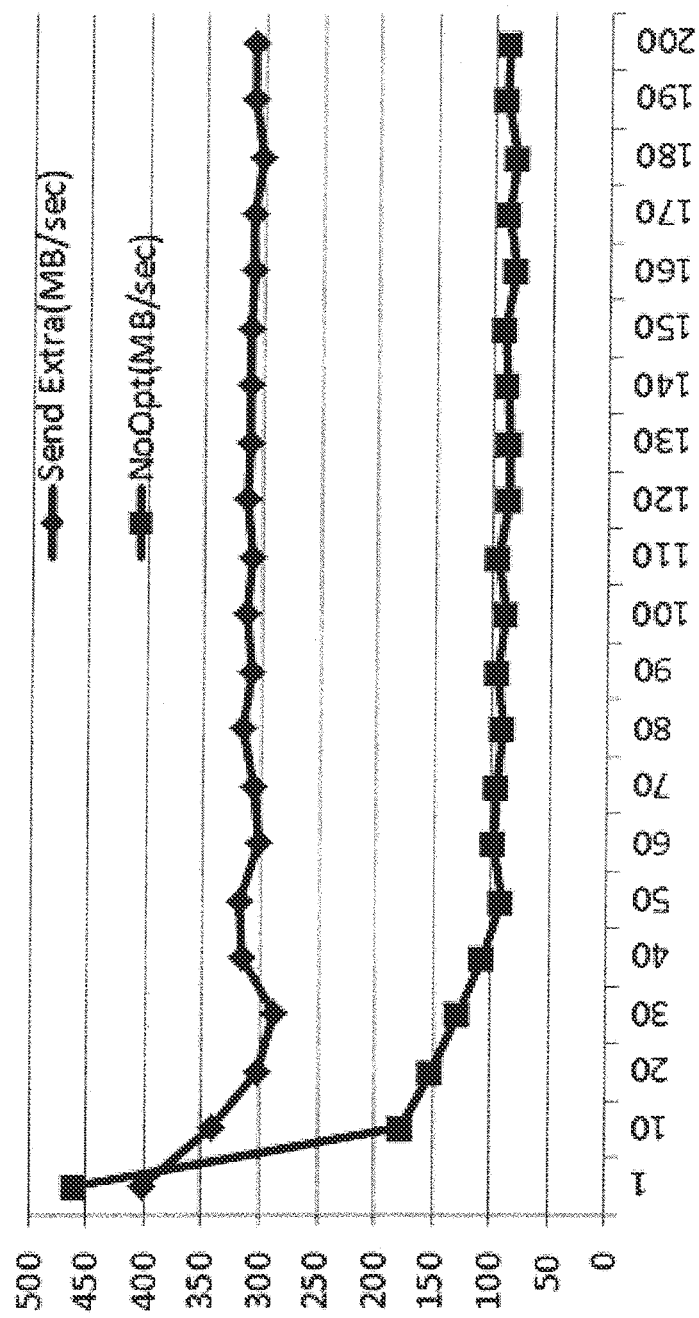
FIG. 5 depicts a comparison of restoration speed in a backup system in accordance with an embodiment of the present disclosure.

FIG. 5 depicts a comparison of restoration speed in a backup system in accordance with an embodiment of the present disclosure. For example, in testing of an embodiment, a restore speed of 300 MB/sec with minimal loss of backup speed is illustrated compared to the original restore speed of 90 MB/sec. The restore speed is improved more than 3 times. FIG. 5 compares the restore speed trace, from the first backup to the 200th backup, of an embodiment versus a non-improved or traditional implementation.

Figure 6:
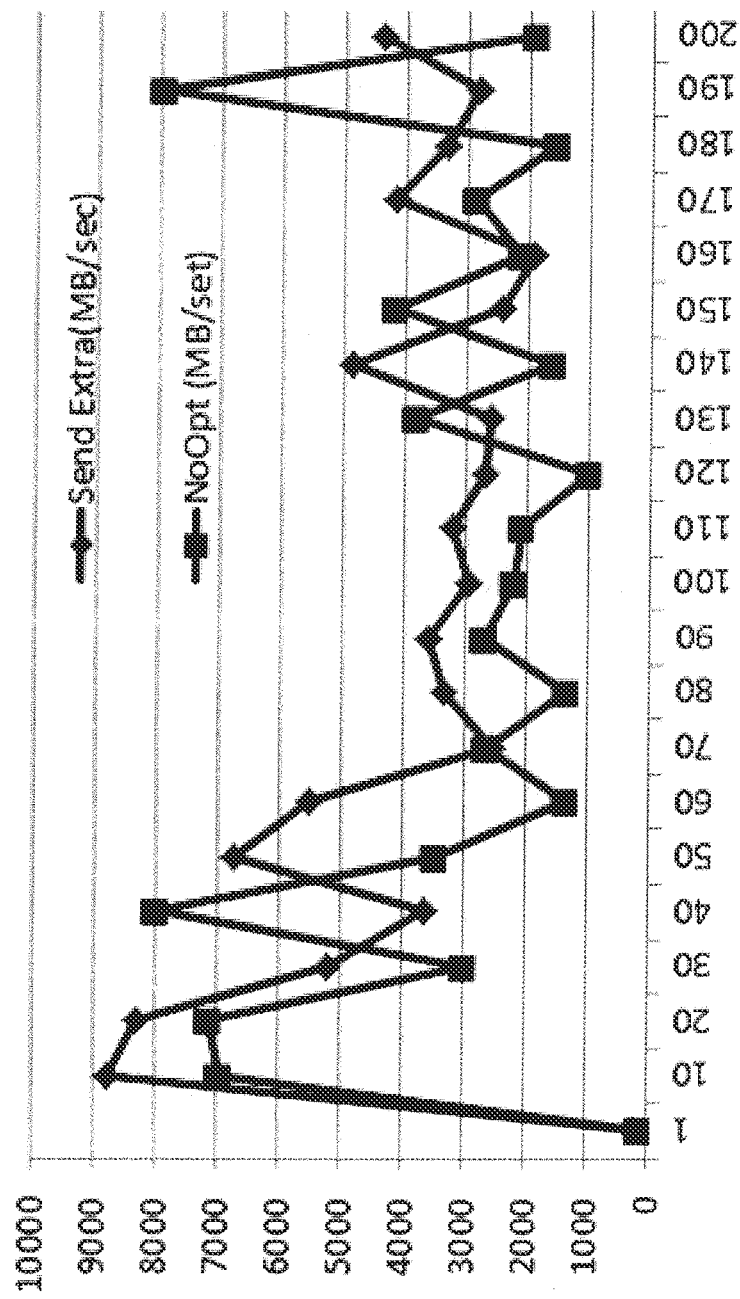
FIG. 6 depicts a comparison of backup speed in a backup system in accordance with an embodiment of the present disclosure.

FIG. 6 depicts a comparison of backup speed in a backup system in accordance with an embodiment of the present disclosure. FIG. 6 illustrates the backup speed of an embodiment versus a non-improved or traditional implementation. Backup speed is compared over 200 backups.

Figure 7:
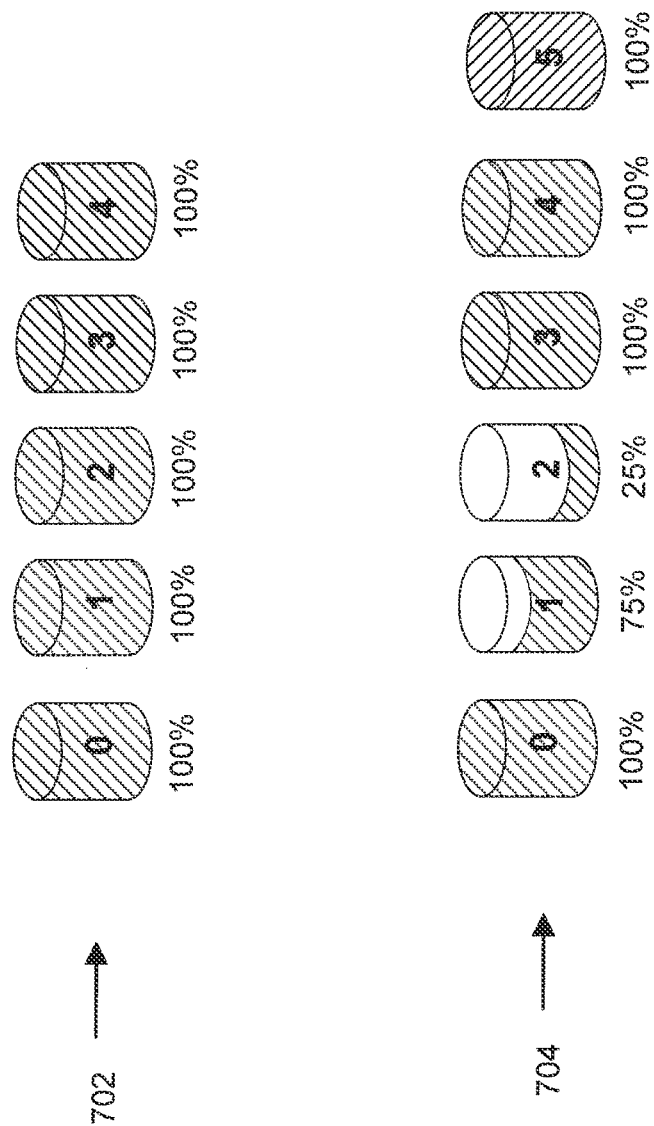
FIG. 7 depicts utilization of containers in a first backup and a second backup in accordance with an embodiment of the present disclosure.
Figure 8:
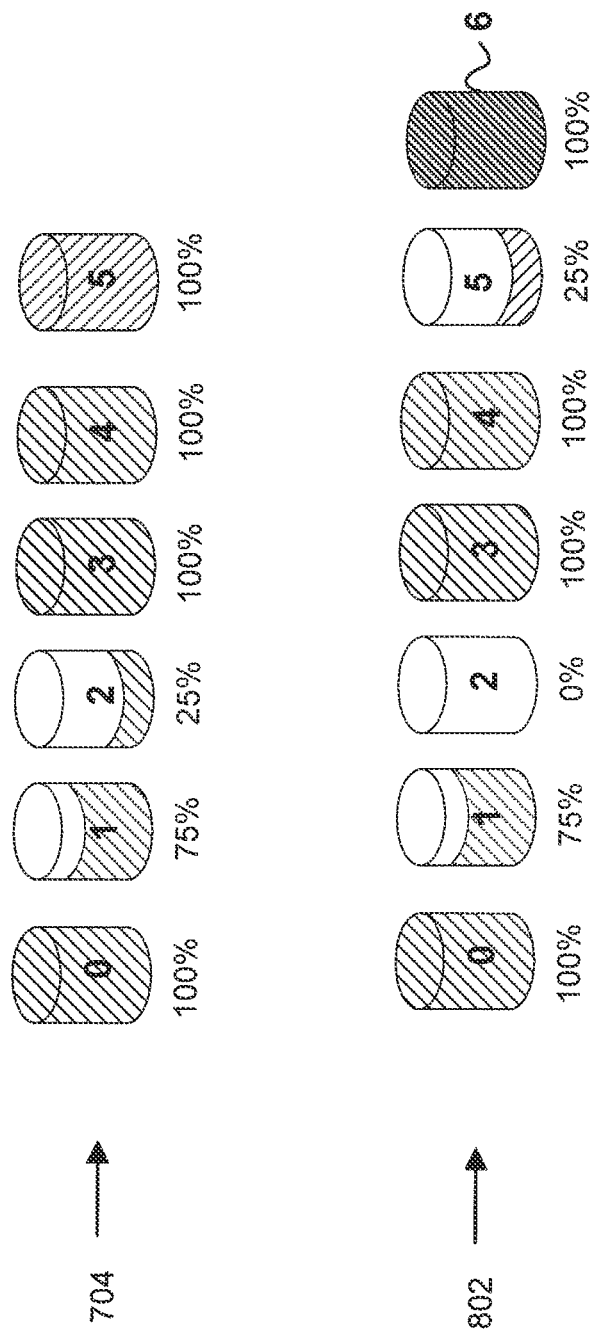
FIG. 8 depicts utilization of containers in a second backup and a third backup in accordance with an embodiment of the present disclosure.
Figure 9:
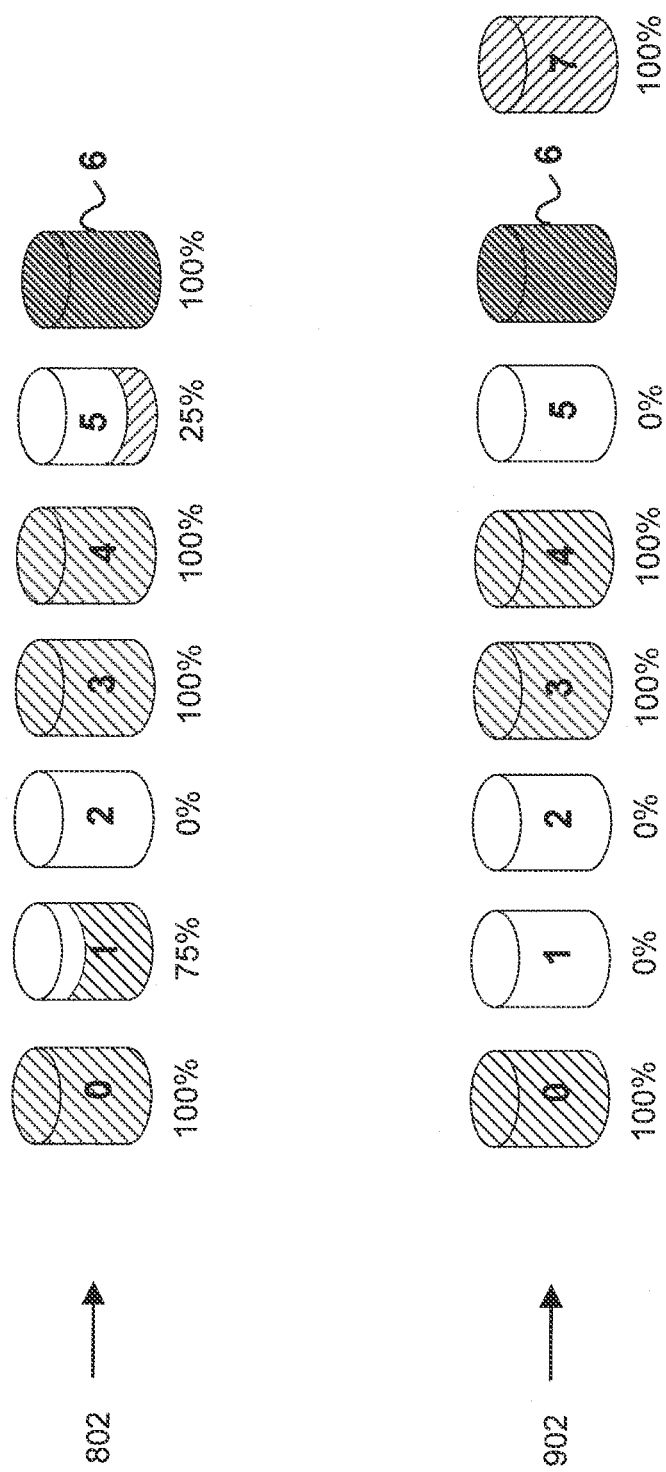
FIG. 9 depicts utilization of containers in a third backup and a fourth backup in accordance with an embodiment of the present disclosure.

FIGS. 7-9 are illustrative depictions of utilization of containers according to an embodiment. In an embodiment depicted the backup image is divided into fixed ranges, e.g. 256 MB, and the utilization rate of the range is calculated at the end of the backup. If the utilization rate is below a threshold (e.g., below 50%, that is, less than half of the data are used by current backup) a range of data for server inclusion may be discarded completely (i.e., references may not be used) and instead data may be sent from the client. For the purposes of illustration in the embodiment, the data range (i.e., a size of containers) may be 20 MB. A utilization threshold at which data is resent from a client may be 50%.

FIG. 7 depicts utilization of containers in a first backup and a second backup in accordance with an embodiment of the present disclosure. The containers in row 702 represent a first backup of 100 MB of new data which uses five 20 MB containers. The referencing history may be represented by [offset, length, gen_number] as follows: [0, 100, 0]. Thus the data may start an offset of 0 for generation 0, contain 100 MB, and be generation number 0 (for the first backup). A sequence of segments and their respective containers may be represented as:

| 0 | 0 | 0 | 0 | 1 | 1 | 1 | 1 | 2 | 2 | 2 | 2 | 3 | 3 | 3 | 3 | 4 | 4 | 4 | 4 |
|---|---|---|---|---|---|---|---|---|---|---|---|---|---|---|---|---|---|---|---|

The second backup may be represented by row 704. As illustrated, the second backup may contain 20 MB of data (i.e., only 20 MB of data was changed from the first backup.) The second backup may contain 35 MB of data starting offset 0 that refers to the prior backup (generation 0), 20 MB of data starting at offset 0 for generation 1, and 45 MB of data that begins at offset 55 for generation 0. The second backup will not send the generation 0 data, references will be created at the server that point to the corresponding segments in generation 0, the prior backup. The referencing history of the second backup may be represented by [offset, length, gen_number] as follows: [0, 35, 0] [0, 20, 1] [55, 45, 0]. A sequence of segments and their respective containers may be represented as:

| 0 | 0 | 0 | 0 | 1 | 1 | 1 | 5 | 5 | 5 | 2 | 3 | 3 | 3 | 3 | 4 | 4 | 4 | 4 |
|---|---|---|---|---|---|---|---|---|---|---|---|---|---|---|---|---|---|---|

As illustrated in row 704, the second backup may utilize 75% of container 1's data and 25% of container 2's data. A new container 5 may be created with generation 1. It may have a referencing history which may be represented by [offset, length, gen_number] as follows: [0, 20, 1]. The new container 5 may contain the 5 MB of changed data from container 1 and the 15 MB of changed data from container 2.

FIG. 8 depicts utilization of containers in a second backup and a third backup in accordance with an embodiment of the present disclosure. Row 704 is unchanged from FIG. 7. Row 802 may represent the third backup. In the third backup 15 MB of data has changed. Because the utilization of container 2 in the second backup was lower than the specified utilization threshold (in this example, 50%), the data of this container may be sent from the client rather than referenced on the server. Sending the data from the client for container 2 may result in an extra 5 MB of data being sent that may have been traditionally deduplicated and referenced on the server using a pointer or reference to an existing copy of the data. The referencing history of the third backup may be represented by [offset, length, gen_number] as follows: [0, 35, 0] [0, 5, 1] [0, 20, 2] [60, 40, 0]. Thus the 5 MB of data that was in container 2 in the prior backup (generation 1) may be resent from the client and stored in new container 6. New container 6 may also contain the 15 MB of data from container 5 that represented the prior backup's changed data to container 2. Container 2 in backup 3 is now 0% utilized and is not needed for a restoration. The latest version of the data from container 2 has migrated to container 6 and thus data locality and restoration performance may be improved. As this is a logical illustration of containers on a per backup basis note that the data from the containers is never deleted, thus container 2 still exists for historical recovery and restoration purposes, but is no longer part of this backup set.

A sequence of segments and their respective containers may be represented as:

| 0 | 0 | 0 | 0 | 1 | 1 | 1 | 5 | 6 | 6 | 6 | 6 | 3 | 3 | 3 | 3 | 4 | 4 | 4 | 4 |
|---|---|---|---|---|---|---|---|---|---|---|---|---|---|---|---|---|---|---|---|

Container 5 is now only 25% utilized and a client backup module may calculate this utilization based on the previously transmitted data.

FIG. 9 depicts utilization of containers in a third backup and a fourth backup in accordance with an embodiment of the present disclosure. Row 802 is unchanged from FIG. 8. Row 902 may represent the fourth backup. The fourth backup may contain 15 MB of data that is changed. Because the utilization of container 5 was detected as below a specified threshold (e.g., 50%) in the last backup, the 5 MB of container 5 (which stored changes to container 1) may be resent from the client and stored in container 7. This may be combined with the 75% of data that was in container 1 into container 7. Thus the backup may now only require only 5 containers to restore and data locality may be further improved. The referencing history of the fourth backup may be represented by [offset, length, gen_number] as follows: [0, 20, 0] [0, 20, 3] [0, 20, 2] [60, 40, 0]. A sequence of segments and their respective containers may be represented as:

| 0 | 0 | 0 | 0 | 7 | 7 | 7 | 7 | 6 | 6 | 6 | 6 | 3 | 3 | 3 | 3 | 4 | 4 | 4 | 4 |
|---|---|---|---|---|---|---|---|---|---|---|---|---|---|---|---|---|---|---|---|

At this point it should be noted that improving performance of a backup system in accordance with the present disclosure as described above typically involves the processing of input data and the generation of output data to some extent. This input data processing and output data generation may be implemented in hardware or software. For example, specific electronic components may be employed in a deduplication performance improvement module or similar or related circuitry for implementing the functions associated with improving performance of a backup system in accordance with the present disclosure as described above. Alternatively, one or more processors operating in accordance with instructions may implement the functions associated with improving performance of a backup system in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for improving performance of a backup system comprising:
   performing a backup of a client device;
   tracking, using the client device, references to data segments that are located outside of a unit of storage associated with the backup, wherein the references are tracked by monitoring an amount of data associated with one or more generations of backups;
   calculating utilization of the unit of storage associated with the backup based on the tracked references;
   determining if the calculated utilization meets a specified parameter; and
   determining one or more responsive actions in the event the calculated utilization meets the specified parameter,
   wherein the responsive action comprises sending one or more segments of unchanged data of a unit of storage in a subsequent backup based on a determination that the calculated utilization of a unit of storage is below a specified threshold,
   wherein the one or more segments of unchanged data from a unit of storage are combined with segments of data from a second unit of storage into a new unit of storage to reduce data fragmentation for a backup.

2. The method of claim 1, further comprising performing the one or more responsive actions.

3. The method of claim 1, wherein the one or more responsive actions further include at least one of: providing calculated utilization information to a user, recommending a backup action to a user, and identifying one or more referenced segments to send in a subsequent backup.

4. The method of claim 1, wherein the tracking of references to data segments outside of the unit of storage is performed by identifying data segments associated with the unit of storage.

5. The method of claim 4, wherein calculating utilization comprises counting the identified data segments associated with the unit of storage and determining the portion of the unit storage used by the identified segments.

6. The method of claim 1, wherein the specified parameter comprises a range of acceptable utilization of a unit of storage.

7. The method of claim 1, wherein the specified parameter comprises a range of unacceptable utilization of a unit of storage.

8. The method of claim 1, wherein the unit of storage associated with the backup comprises a container.

9. The method of claim 1, further comprising providing a user interface to set a parameter specifying a utilization threshold for the unit of storage.

10. The method of claim 9, wherein the user interface provides an indication of utilization for the unit of storage and an indication of estimated restoration time based at least in part on an estimation of fragmentation of data of the unit of storage.

11. The method of claim 10, wherein the user interface provides an indication of estimated backup time based at least in part on a level of deduplication of data for the unit of storage.

12. At least one non-transitory processor readable storage medium storing a computer program of instructions configured to be readable by at least one processor for instructing the at least one processor to execute a computer process for performing the method as recited in claim 1.

13. An article of manufacture for improving performance of a backup system, the article of manufacture comprising:
   at least one non-transitory computer processor readable storage medium; and
   instructions stored on the at least one non-transitory computer processor readable storage medium;
   wherein the instructions are configured to be readable from the at least one non-transitory computer processor readable storage medium by at least one computer processor and thereby cause the at least one computer processor to operate so as to:
   perform a backup of a client device;
   track, using the client device, references to data segments that are located outside of a unit of storage associated with the backup, wherein the references are tracked by monitoring an amount of data associated with one or more generations of backups;
   calculate utilization of the unit of storage associated with the backup based on the tracked references;
   determine if the calculated utilization meets a specified parameter; and
   determine one or more responsive actions in the event the calculated utilization meets the specified parameter,
   wherein the responsive action comprises sending one or more segments of unchanged data of a unit of storage in a subsequent backup based on a determination that the calculated utilization of a unit of storage is below a specified threshold,
   wherein the one or more segments of unchanged data from a unit of storage are combined with segments of data from a second unit of storage into a new unit of storage to reduce data fragmentation for a backup.

14. A system for improving performance of a backup system comprising:
   one or more computer processors communicatively coupled to a network; wherein the one or more computer processors are configured to:
   perform a backup of a client device;

track, using the client device, references to data segments that are located outside of a unit of storage associated with the backup, wherein the references are tracked by monitoring an amount of data associated with one or more generations of backups;
calculate utilization of the unit of storage associated with the backup based on the tracked references;
determine if the calculated utilization meets a specified parameter; and
determine one or more responsive actions in the event the calculated utilization meets the specified parameter,
wherein the responsive action comprises sending one or more segments of unchanged data of a unit of storage in a subsequent backup based on a determination that the calculated utilization of a unit of storage is below a specified threshold,
wherein the one or more segments of unchanged data from a unit of storage are combined with segments of data from a second unit of storage into a new unit of storage to reduce data fragmentation for a backup.

15. The system of claim 14, wherein the tracking of references to data segments outside of the unit of storage is performed by identifying data segments associated with a unit of storage.

* * * * *